Nov. 8, 1949   P. COLLINS   2,487,425
ANIMAL DELIVERY APPARATUS
Filed Nov. 9, 1948   2 Sheets-Sheet 2
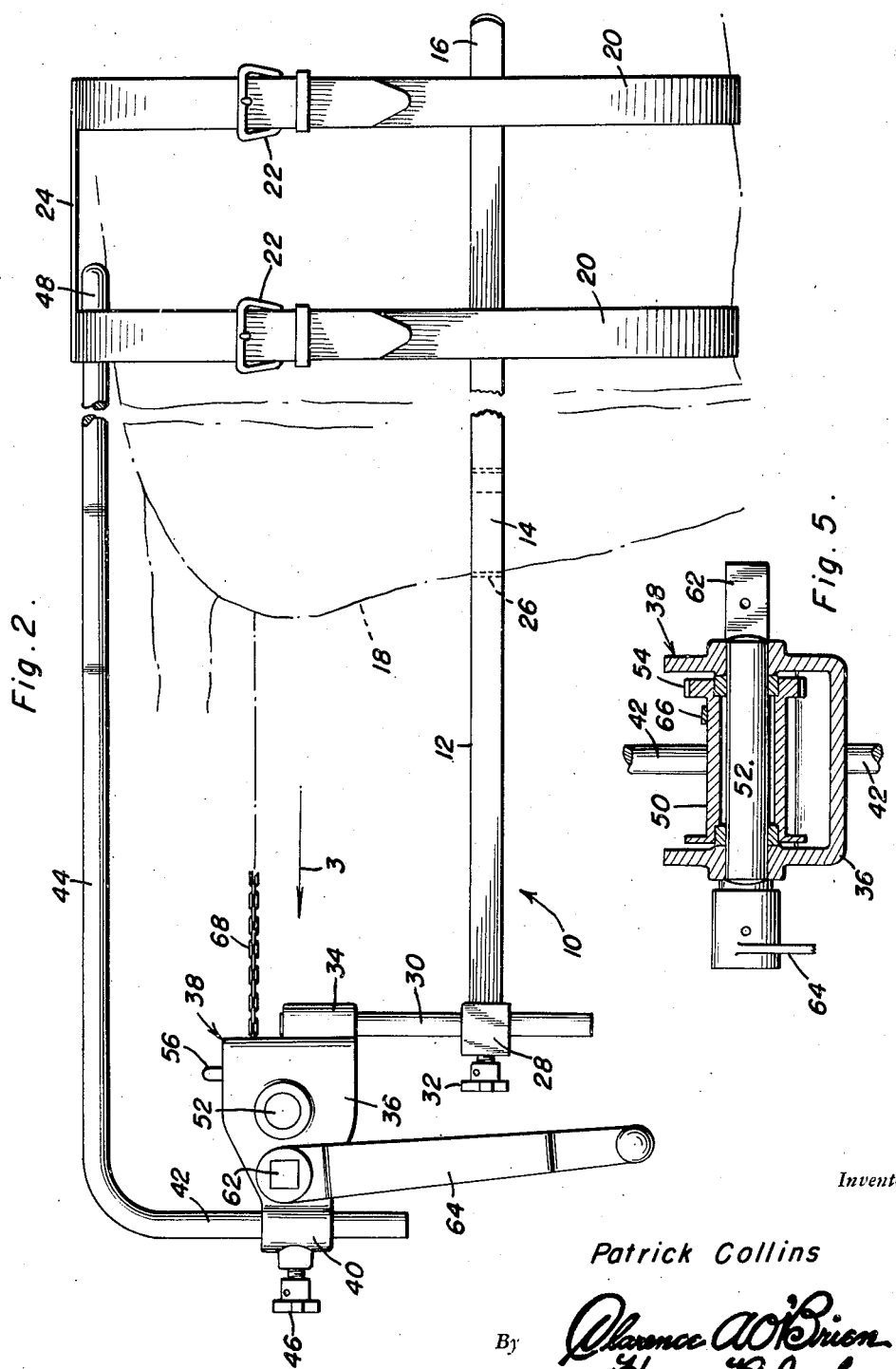
Inventor
Patrick Collins Patented Nov. 8, 1949

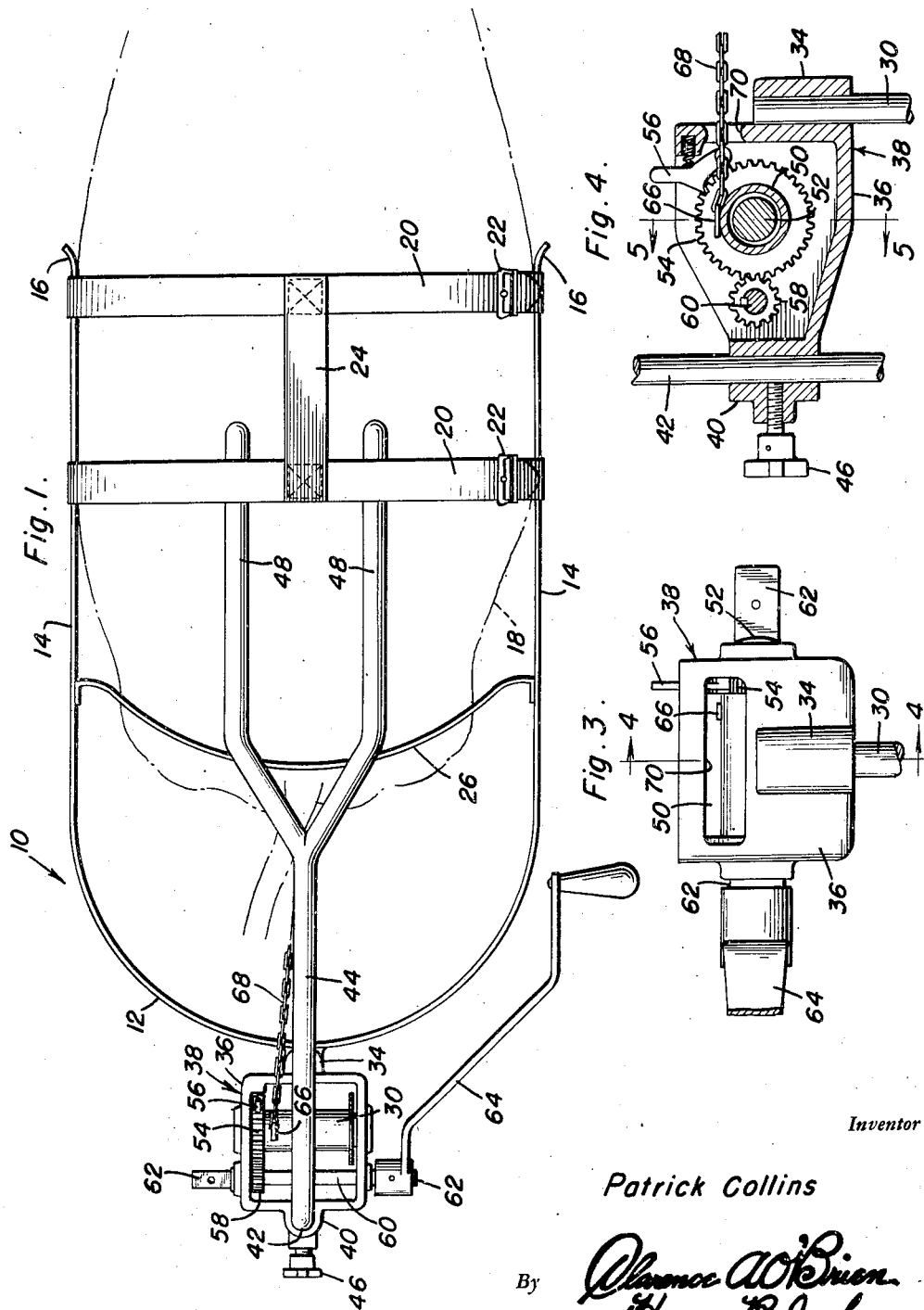

2,487,425

UNITED STATES PATENT OFFICE 2,487,425

ANIMAL DELIVERY APPARATUS

Patrick Collins, Houston, Tex.

Application November 9, 1948, Serial No. 59,035

5 Claims. (Cl. 128—352)

1

This invention relates to new and useful improvements and structural refinements in implements or instruments used by veterinary surgeons, and the principal object of the invention is to facilitate, by mechanical means, the delivery of a fetus from its parent animal, such as for example, a cow, a horse, or the like.

In particular, the invention concerns itself with that type of apparatus wherein a rope, chain or cable, windable upon a winch, may be connected to the legs of the fetus so that the latter, upon actuation of the winch, the fetus may be gently, comfortably and positively assisted in its expulsion from the vaginal canal.

An important feature of the invention resides in the provision of an apparatus of this nature which may be easily and conveniently applied and secured to the abdominal portion and hind quarters of the parent animal, and which may be effectively utilized regardless of whether the parent animal is standing or lying on its side.

Some of the advantages of the invention reside in its simplicity of construction, convenience of operation, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a top plan of the invention applied to a parent animal, the latter being shown by phantom lines.

Figure 2 is a side elevational view of the subject shown in Figure 1.

Figure 3 is a fragmentary elevational detail, taken substantially in the direction of the arrow 3 in Figure 2.

Figure 4 is a fragmentary cross sectional view, taken substantially in the plane of the line 4—4 in Figure 3, and Figure 5 is a cross sectional view, taken substantially in the plane of the line 5—5 in Figure 4.

Like characters of reference are employed to designate like parts in the specification and throughout the several views.

Referring now to the accompanying drawings in detail, the invention consists of an animal delivery apparatus indicated generally by the reference character 10, the same embodying in its construction a substantially U-shaped yoke 12 which is provided at the free ends of its side members 14 with out turned end portions 16, the yoke

2

12 being adapted to straddle the parent animal illustrated by the phantom lines 18, with the side members 14 being in engagement with the abdominal portion of the parent animal, substantially as shown.

A pair of spaced belts or straps 20 extend circumferentially around the abdominal portion of the parent animal and overlap the side members 14 of the yoke 12, whereby the yoke is firmly secured to the animal and projects rearwardly therefrom, substantially as shown. The belts or straps 20 are provided with suitable buckles 22, and if desired, these belts or straps may be connected together by suitable tie straps, one of which is indicated at 24.

An arcuate cross member 26 is secured at the ends thereof to intermediate portions of the side members 14 of the yoke 12, the cross member 26 being adapted to engage the hind quarters of the parent animal in such manner that the yoke 12 is prevented from sliding forwardly on the animal, as will be clearly understood.

The bight portion of the yoke 12 carries a block 28 formed with a vertical bore in which is slidably adjustable a shaft 30, and the latter may be locked in any desired position by means of a set screw 32 with which the block 28 is provided.

The upper end portion of the shaft 30 is rigidly secured in a boss 34 which is formed integrally with the frame 36 of a winch unit designated generally by the reference character 38, and it is to be noted that the frame 36 of this winch unit is formed integrally with another boss 40.

The boss 40 is provided with a vertical bore in which is slidably adjustable a downwardly angulated portion 42 of a horizontally extending reinforcing member 44, a suitable set screw 46 being provided in the boss 40 for the purpose of locking the member portion 42 in a predetermined position, as will be clearly understood.

As is best shown in Figures 1 and 2, the member 44 extends forwardly from the winch frame 36 and the forward end portion thereof is bifurcated as at 48, so that it may be engaged with the back of the parent animal 18 at the sides of the chine, substantially as shown. The bifurcated portion 48 of the reinforcing member 44 is overlapped by one of the aforementioned belts or straps 20, whereby the bifurcated portion of the reinforcing member is firmly retained in engagement with the back of the parent animal.

The aforementioned winch unit 38 includes in its construction a drum 50 mounted upon a transverse shaft 52 provided in the winch frame 36, one flange of the drum 50 constituting a ratchet 54 which is engageable by a spring pressed pawl 56, as is best shown in Figuure 4. The ratchet 54, in effect, assumes the form of a large gear which meshes with a small pinion 58 secured to the shaft 60, the shaft 60 being rotatably journaled in the winch frame 36 and having square or polygonal end portions 62 which project outwardly at both sides of the winch frame, substantially as shown. A suitable crank handle 64 is attachable selectively to the two end portions 62 of the shaft 60, whereby the winch unit may be operated from either side, depending on which side the parent animal may be lying.

The drum 50 of the winch unit is provided with a detent 66 to which is attached one end of a chain, rope or cable 68, this chain or cable being windable upon the winch drum and its remaining end being attachable in any suitable manner to the legs of the fetus.

It will be apparent from the foregoing that when the invention is placed in use and is attached to the parent animal as already described, actuation of the winch unit 38 by means of the handle 64 will cause the cable or chain 68 to gently but positively assist the fetus in its expulsion from the vaginal canal of the parent animal, that is to say, the chain or cable will exert an outward pulling force on the fetus while the pawl 56, engaging the ratchet gear 54, will prevent the fetus from being retracted into the vaginal canal by muscular reflexes.

By virtue of the adjustment of the shaft 30 in the block 28 as facilitated by the screw 32, and a similar adjustment of the member portion 42 in the boss 40 as facilitated by the screw 46, the winch unit 38 may be preset in substantial alignment with the vaginal canal so that a more-or-less direct pulling force may be exerted by the cable or chain 68. If necessary, the winch frame 36 may be formed with an elongated opening or slot 70 through which the chain or cable 68 may freely pass.

Finally, it should be understood that the side members 14 of the yoke 12 possess sufficient inherent resiliency so that they may be spread apart or retracted as necessitated by the transverse dimension of the parent animal's abdominal portion.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In an animal delivery apparatus, the combination of a substantially U-shaped yoke adapted to straddle a parent animal and extend rearwardly therefrom, means encircling the abdominal portion of the parent animal and clamping the side portions of said yoke against the same, a cross member extending between the side portions of said yoke and adapted to engage hind quarters of the parent animal, and a fetus extracting winch mounted on the bight portion of said yoke.

2. The device as defined in claim 1 together with a reinforcing member attached to said winch and engageable with the back of the parent animal.

3. An animal delivery apparatus comprising a substantially U-shaped yoke adapted to straddle a parent animal and extend rearwardly therefrom, said yoke having laterally spreadable and retractable side members, means encircling the abdominal portion of the parent animal and clamping said side members against the same, an arcuate cross member extending between intermediate portions of said side members and adapted to engage hind quarters of the parent animal, a vertically adjustable fetus extracting winch provided on the bight portion of said yoke, and a vertically adjustable reinforcing member attached to said winch and extending forwardly therefrom, the forward end portion of said reinforcing member being bifurcated and engageable with the back of the parent animal at the sides of the chine.

4. The device as defined in claim 3 wherein said means include a plurality of belts extending circumferentially around the abdominal portion of the parent animal and overlapping said side members.

5. The device as defined in claim 3 wherein said winch includes a frame formed with an open ended bore, the rear end portion of said reinforcing member being downturned and slidable in said bore, and a locking screw on said frame engageable with the downturned portion of said reinforcing member.

PATRICK COLLINS.

No references cited.